C. H. Platt,
Tackle-Block Bush,
Nº 35,622.      Patented June 17, 1862.
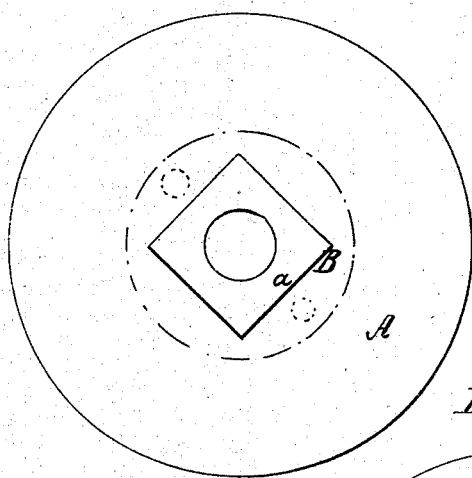
Fig. 1.
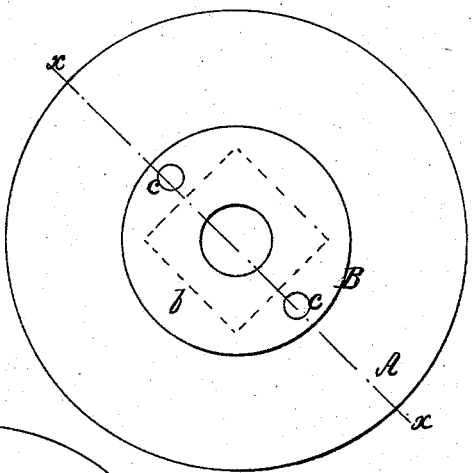
Fig. 2.
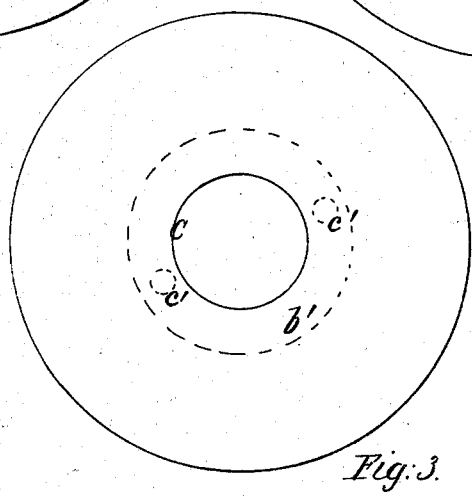
Fig. 6.
Fig. 5.
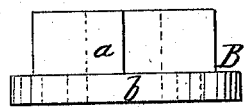
Fig. 4.
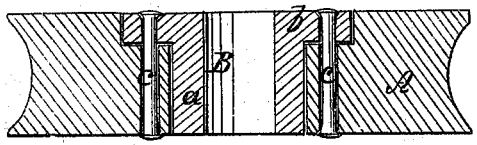
Fig. 3.
Witnesses:
James Laird
Richardson Gawley
Inventor:
Chas. H. Platt

UNITED STATES PATENT OFFICE.

CHARLES H. PLATT, OF NEW YORK, N. Y.

IMPROVED BUSH FOR THE SHEAVES OF TACKLE-BLOCKS.

Specification forming part of Letters Patent No. 35,622, dated June 17, 1862.

*To all whom it may concern:*

Be it known that I, CHARLES H. PLATT, of the city, county, and State of New York, have invented a new and useful Improvement in Metallic Bushes for Wooden Sheaves; and I do hereby declare that the following is a full, clear, and exact description of the same, reference being had to the accompanying drawings, making a part of this specification, in which—

Figure 1 is a side view of a sheave with my invention applied to it. Fig. 2 is also a side view of the same, opposite to that shown in Fig. 1; Fig. 3, a section of the same, taken in the line $x\ x$, Fig. 2; Fig. 4, a detached side view of the bush; Fig. 5, an end view of Fig. 4; Fig. 6, a side view of a sheave provided with the ordinary metal bush.

Similar letters of reference indicate corresponding parts in the several figures.

This invention consists in having the greater portion of the bush which is fitted in the wooden sheave made of square or polygonal form, as hereinafter described, so as to effectually prevent the turning of the bush within the sheave without depending on the bolts which pass through the latter to effect that result.

The ordinary metallic bushes are made of cylindrical form, and are prevented from turning in the sheave by pins or bolts which pass through a flange of the bush and the sheave. These pins or bolts soon wear the sheave and become loose therein, and the latter is liable to split. This difficulty is fully obviated by my invention.

To enable those skilled in the art to fully understand and construct my invention, I will proceed to describe it.

A represents a wooden sheave, and B is a metallic bush which is fitted therein. This bush B has its larger or main portion made of square or polygonal form, as shown at $a$ in Figs. 1, 4, and 5, the other portion, $b$, of the bush being larger in diameter than $a$ and of circular form, as shown clearly in Fig. 5. The part $b$ of the bush, which may be termed the "flange," is let in the side of the sheave, so that its outer surface will be flush with it, and the square part $a$ is of such a length that its outer end will be flush with the opposite side of the sheave, as shown clearly in Fig. 3. The sheave A is mortised at its center, so as to receive snugly the part $a$ of the bush. The flange $b$ has two holes drilled through it at opposite points to allow bolts $c\ c$ to pass through it, said bolts also passing through the sheave A. The heads $d$ of the bolts are let in the sheave at the side opposite to that which receives the flange $b$, and the ends of the bolts are headed or riveted in the countersunk holes of the flange.

In my improvement it will be seen that the bolts $c\ c$ merely prevent the bush B from moving endwise out of the sheave; they are not intended to prevent the turning of the bush in the sheave, for that end is attained by the square or polygonal part $a$, and as said bolts are not subjected to any strain they cannot work loose in the sheave, and the latter therefore will not be liable to split, as is the case with the ordinary metallic bush C, as shown in Fig. 6. This bush C has its smaller part, $a'$, of cylindrical form, and consequently the bolts $c'\ c'$, which pass through its flange $b'$, alone prevent it from turning in the sheave. These bolts $c'$, owing to the strain to which they are subjected, in a short time work loose in the sheave and are liable to split it. When they get a little loose the wear rapidly increases, and in a short time the sheave works very imperfectly.

This invention is applicable to all wooden sheaves, whether inserted in blocks or used otherwise as ordinary pulleys.

Having thus described my invention, what I claim as new, and desire to secure by Letters Patent, is—

A metallic bush, B, for wooden sheaves A, formed of a square or polygonal part, $a$, provided with a flange, $b$, of circular or other form, to admit of the bolts $c$ passing through it, substantially as and for the purpose set forth.

CHAS. H. PLATT.

Witnesses:
JAMES LAIRD,
J. W. COOMBS.